United States Patent [19]

Grilliot et al.

[11] Patent Number: 5,001,783
[45] Date of Patent: * Mar. 26, 1991

[54] FIREFIGHTER'S GARMENTS HAVING MINIMUM WEIGHT AND EXCELLENT PROTECTIVE QUALITIES

[76] Inventors: William L. Grilliot; Mary I. Grilliot, both of 1986 Home Ave., Dayton, Ohio 45417

[*] Notice: The portion of the term of this patent subsequent to Feb. 6, 2007 has been disclaimed.

[21] Appl. No.: 434,325

[22] Filed: Nov. 13, 1989

Related U.S. Application Data

[63] Continuation of Ser. No. 278,553, Nov. 30, 1988, Pat. No. 4,897,886.

[51] Int. Cl.⁵ .............................................. A41D 13/00
[52] U.S. Cl. .............................................. 2/81; 2/69; 428/920
[58] Field of Search .................. 2/69, 81, 82, 87, 93, 2/97, 243 R, 272; 428/166, 178, 920, 921

[56] References Cited

U.S. PATENT DOCUMENTS

| | | | |
|---|---|---|---|
| 3,577,305 | 5/1971 | Hines | 2/243 R |
| 3,710,395 | 1/1973 | Spano | 2/81 |
| 3,849,802 | 11/1974 | Govaars | 2/81 |
| 4,136,222 | 1/1979 | Jonnes | 2/243 R |
| 4,185,327 | 1/1980 | Markve | 428/178 |
| 4,401,707 | 8/1983 | Bailey | 428/166 |
| 4,500,593 | 2/1985 | Weber | 428/920 |
| 4,502,153 | 3/1985 | Lapedes | 2/81 |
| 4,547,906 | 10/1985 | Nishida | 2/97 |
| 4,550,046 | 10/1985 | Miller | 428/920 |
| 4,583,247 | 4/1986 | Fingerhut | 2/69 |
| 4,604,759 | 8/1986 | Bowman et al. | 2/81 |
| 4,685,155 | 8/1987 | Fingerhut | 2/81 |
| 4,709,421 | 12/1987 | Grillot et al. | 2/81 |
| 4,748,691 | 6/1988 | Grilliot et al. | 2/81 |
| 4,805,244 | 2/1989 | Scott | 2/81 |
| 4,833,731 | 5/1989 | Foxman | 2/69 |

FOREIGN PATENT DOCUMENTS 1115708  9/1984  U.S.S.R. .................. 2/272

Primary Examiner—Werner H. Schroeder
Assistant Examiner—Diana L. Biefeld
Attorney, Agent, or Firm—Jacox & Meckstroth

[57] ABSTRACT

A firefighter's garment as disclosed herein may be a coat or trousers or a vest. The garment has an outer layer, an intermediate layer, and an inner layer. A spacer element or elements are positioned between two of the layers of the garment. The spacer element or elements in the firefighter's garment establish and maintain an air space or air spaces between the layers of the garment, even when localized pressure or weight is applied to portions of the garment. Thus, the firefighter's garment has excellent heat insulation qualities without being heavy and/or bulky. Thus, a firefighter wearing the garment is continually protected and is subject to minimum stress and is able to work more effectively than a firefighter wearing a firefighter's conventional garment.

14 Claims, 2 Drawing Sheets

FIREFIGHTER'S GARMENTS HAVING MINIMUM WEIGHT AND EXCELLENT PROTECTIVE QUALITIES

This application is a continuation of Application Ser. No. 278,553, filed Nov. 30, 1988, now U.S. Pat. No. 4,897,886.

BACKGROUND OF THE INVENTION

During the fighting of a fire, a firefighter works in a very hostile environment. Many firefighters lose their lives while fighting fires. Most of the deaths of firefighters while fighting fires are the result of stress, heart attacks, strokes, and the like. Of course, a firefighter must be protected from the environment within which the firefighter works. However, in an attempt to provide adequate protection, the garments of firefighters have been too heavy and too bulky.

Firefighter's coats and trousers customarily have three layers of material: an outer shell or layer, which is flame resistant and abrasion resistant, and an intermediate layer which is a moisture barrier, and an inner layer, which is a thermal barrier. These layers may be three separate distinct layers or may be one or two members.

Customarily, the inner layer, or thermal barrier, in a firefighter's garment is significantly thick and bulky. Optimal thermal insulation in a garment is dead air space within the garment. Dead air space can be provided in a garment at relatively low costs. Dead air space creates minimal weight in a garment. However, even though dead air as a thermal insulator in a garment has been recognized in the clothing industry, this fact has not received significant recognition in the design and construction of firefighters' protective clothing.

This absence of use of dead air insulation in firefighters' clothing has resulted from the fact that in a garment which is designed for dead air as thermal insulation, that dead air insulation must be guaranteed and maintained during all firefighting activity of a firefighter who wears the garment. Localized pressure upon a firefighter's garment may occur as a firefighter carries firefighting apparatus, or an object or a person. Localized pressure may also occur in a firefighter's garment as the firefighter moves and works. During firefighting activity a firefighter frequently finds it necessary to carry relatively heavy and/or bulky items, such as a breathing apparatus tank, water hose, and the like. If conventional dead air space means in clothing should be provided in a firefighter's garment, such heavy items carried by the firefighter would apply pressure upon portions of the firefighter's clothing and would reduce or destroy the dead air space in the firefighter's garment. Thus, conventional dead air space structure for thermal insulation cannot be employed in a firefighter's garment, because such conventional structure cannot assure or maintain dead air space in a firefighter's garment.

It is an object of this invention to provide firefighters' garments which have the same quality of protection or better protection against the environment than conventional firefighters' garments but which have significantly less weight, permitting greater ease of movement of the firefighters and less stress upon the firefighters than conventional garments of firefighters.

It is another object of this invention to provide firefighters' garments in which dead air space is employed as thermal insulation and in which the dead air space is maintained even when significant external pressure or weight is applied to the garments.

Another object of this invention is to provide firefighters' garments which contain ventilation means.

Another object of this invention is to provide a means and a method which can be used in constructing firefighters' coats, vests, and trousers, and other garments or wearing apparel in which air space is employed as insulation.

Another object of this invention is to provide such firefighters' garments which can be constructed at lower costs than firefighters' conventional garments.

Other objects and advantages of the firefighters' garments of this invention reside in the construction of parts, the combination thereof, the method of production and the mode of use, as will become more apparent from the following description.

SUMMARY OF THE INVENTION

In this invention the inner layer of a firefighter's garment is reduced to a very thin dimension and air spacer means which create and maintain a dead air space is positioned between the intermediate layer and the inner layer. The air space provides excellent thermal protection while permitting the garment to have minimum weight. The air spacer means is capable of maintaining an air space or air spaces in the garment even under conditions of localized pressure or weight upon the garment.

In this invention any suitable material which provides and maintains an air space or air spaces between the inner layer and the intermediate layer can be used. Preferably, the spacer material between the intermediate layer and the inner layer is a heat resistant corrugated mesh material which creates and maintains a multiplicity of small air spaces, while also providing resistance against compressional forces. However, other spacer means or spacer materials and/or elements can be used to create and maintain an air space or air spaces between the intermediate layer and the inner layer.

A firefighter's garment made according to this invention may have the air spacer means between the inner layer and the intermediate layer throughout the entire garment. However, a firefighter's garment made according to this invention may have the thermal or inner layer of conventional material throughout some portions of the garment and the air spacer means of this invention within the other portions of the garment. Preferably, the corrugations or spacer elements of the air spacer means are arranged to create ventilation through the garment.

The air spacer means of this invention serve several functions: The air spacer means provide a firefighter's garment with excellent thermal protection with minimum weight. The air spacer means maintain the same insulation qualities in the garment, even though localized pressure or loads may be applied to exterior portions of the garment as the firefighter works. The air spacer means of this invention also maintain the same insulation qualities in the firefighter's garment as localized pressure occurs as the firefighter moves arms, legs, shoulders and other parts of the body. Preferably, the air spacer means also provide for ventilation of the garment as the air spacer means create upwardly extending channels in the garment through which the body heat of the firefighter escapes to the exterior of the garment.

Thus, stress upon a firefighter is greatly reduced as the firefighter wears garments of this invention which have minimum weight, with enhanced insulation qualities and with ventilation qualities.

A firefighter's garment made according to this invention meets and complies with all of the standard requirements for thermal insulation and flame resistance, even though a garment of this invention is much lighter in weight and involves less stress in the firefighter than conventional firefighter garments.

A garment constructed in accordance with this invention may comprise a coat or a vest or trousers, or any other article of wearing apparel.

BRIEF DESCRIPTION OF THE VIEWS OF THE DRAWINGS

FIG. 5 may be considered as being taken substantially on line 2—2 of FIG. 1.

FIG. 7 may be considered as being taken substantially on line 2—2 of FIG. 1.

DETAILED DESCRIPTION OF THE INVENTION

Figure 1:
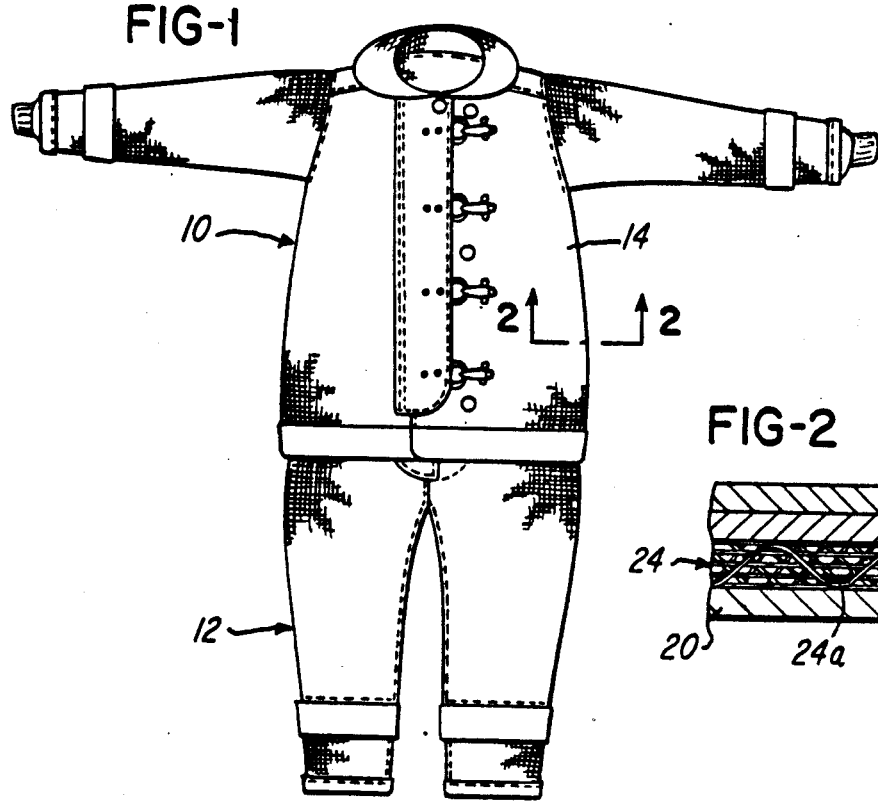
FIG. 1 is a plan view illustrating a firefighter's which include a coat and trousers.
Figure 2:
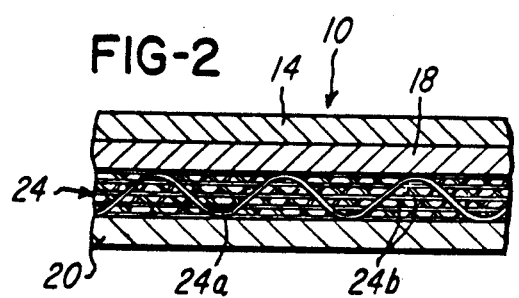
FIG. 2 is a greatly enlarged sectional view taken substantially on line 2—2 of FIG. 1.
Figure 3:
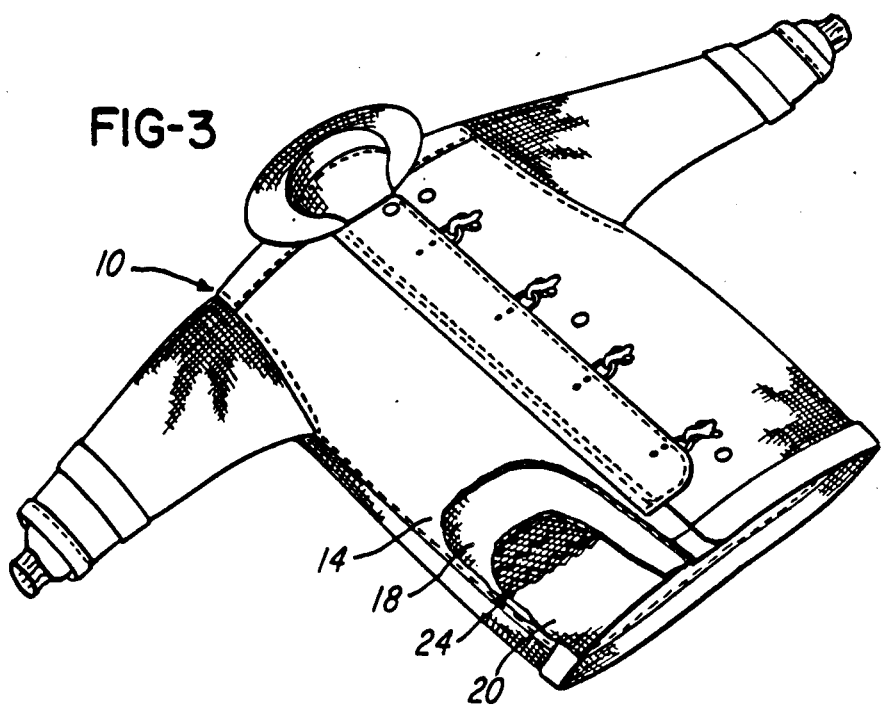
FIG. 3 is a perspective view, drawn substantially on the same scale as FIG. 1, illustrating a firefighter's coat constructed according to this invention, with parts broken away and shown in section.

FIG. 1 illustrates a firefighter's coat or jacket 10 and trousers 12 made according to this invention. The coat 10 and the trousers 12 comprise several layers of material. Preferably, the layers of material in the coat 10 and trousers 12 are substantially the same. As illustrated in FIG. 2, the coat 10 has an outer shell or outer layer 14 which is of flame resistant and abrasion resistant material. The coat 10 also has an intermediate layer 18, which is a moisture barrier. The coat 10 also has an inner layer 20, which is a thermal barrier.

In a conventional firefighter's garment the inner layer of thermal barrier is of relatively thick and bulky material. However, as shown in FIG. 2, in this invention, the inner layer or thermal barrier 20 in the coat 10 is relatively thin and flexible.

Between the inner layer 20 and the intermediate layer 18 in the coat 10 is a spacer member 24 which is in the form of a sheet or liner of a heat resistant material which provides an air space or air spaces between the inner layer 20 and the intermediate layer 18. The air space or air spaces provide excellent thermal insulation in the garment, while maintaining minimum weight in the garment. The spacer member 24 is shown as including a corrugated element 24a and a plurality of flat elements 24b. The elements 24a and 24b are attached together. The spacer member 24 is attached to the inner layer 20 and/or to the intermediate layer 18 by any suitable means, such as by stitching or the like. The spacer member 24 may be any suitable heat resistant material. The spacer member may be, for example, a Teflon material or the like. The spacer member 24 may be, for example, constructed of a material sold by Kimbre, Inc., Perrino, Fla. and referred to by that company as mist eliminator material.

FIG. 4

Figure 4:
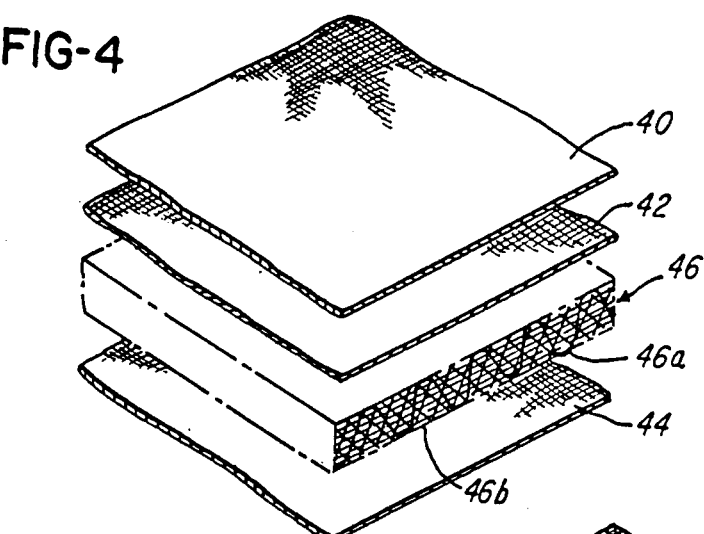
FIG. 4 is an exploded fragmentary perspective view, drawn on a smaller scale than FIG. 2, illustrating a modification in the spacer means which is positioned between the inner layer and the intermediate layer of a firefighter's garment in accordance with this invention.

FIG. 4 shows a portion of a firefighter's garment, such as the garment 10 or 12, constructed in accordance with this invention. The garment includes an outer shell or layer 40, an intermediate layer 42, and an inner layer 44. Between the inner layer 44 and the intermediate layer 42 is a spacer member 46, which is shown as being a sheet or liner having a plurality of interwoven corrugated spacer elements 46a and a plurality of flat spacer elements 46b. The spacer elements 46a and 46b are attached together and provide an air space or air spaces between the intermediate layer 42 and the inner layer 44. The spacer elements 46a and 46b may be of Teflon material or any other heat resistant material. The spacer member 46 is attached to the intermediate layer 42 and to the inner layer 44 by any suitable means, such as by stitching or the like. Thus, the spacer members 46 provide air spaces within the garment and thus provide excellent thermal insulation within the garment while maintaining minimum weight.

Figure 5:
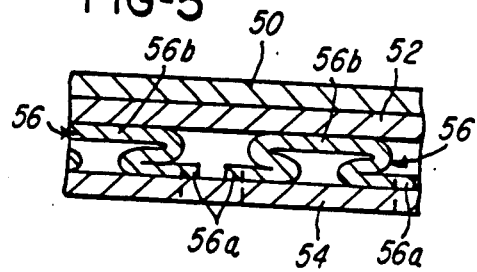
FIG. 5 is a fragmentary sectional view, drawn on substantially the same scale as FIG. 2, illustrating another modification in the spacer means positioned between the inner layer and the intermediate layer in a firefighter's garment constructed in accordance with this invention.
Figure 6:
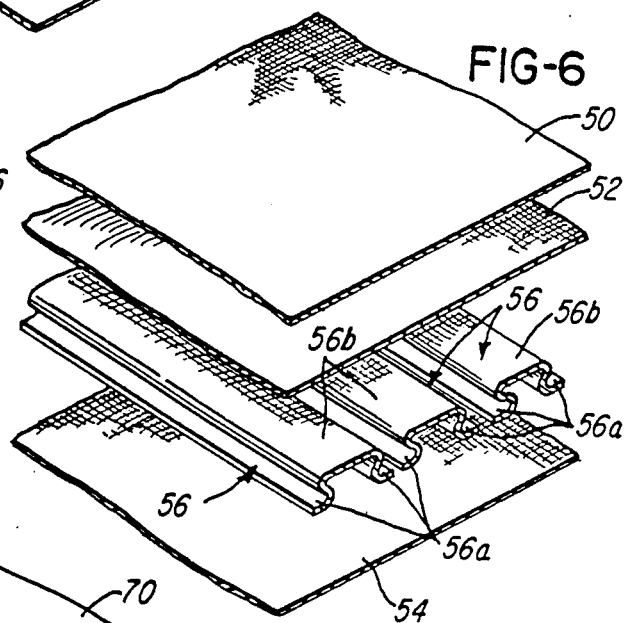
FIG. 6 is an exploded fragmentary perspective view, drawn on substantially the same scale as FIG. 4, further illustrating the spacer structure shown in FIG. 5.

FIGS. 5 and 6

FIGS. 5 and 6 show a portion of a firefighter's garment constructed in accordance with this invention. FIG. 5 may be considered as being taken substantially on line 2—2 on FIG. 1. The garment has an outer shell or layer 50, an intermediate layer 52, and an inner layer 54. Between the inner layer 54 and the intermediate layer 52 is a plurality of spaced-apart spacer elements 56. The spacer elements 56 provide air spaces between the inner layer 54 and the intermediate layer 52 and thus provide excellent thermal insulation while maintaining minimum weight. Each of the spacer elements 56 is generally U-shaped with legs 56a stitched to the inner layer 54 and a body portion 56b stitched to the intermediate layer 52. However, the legs 56a may be attached to the intermediate layer 52 and the body portion 56b may be attached to the inner layer 54. The spacer elements 56 comprise strips of flexible heat resistant or heat insulation material.

Figure 8:
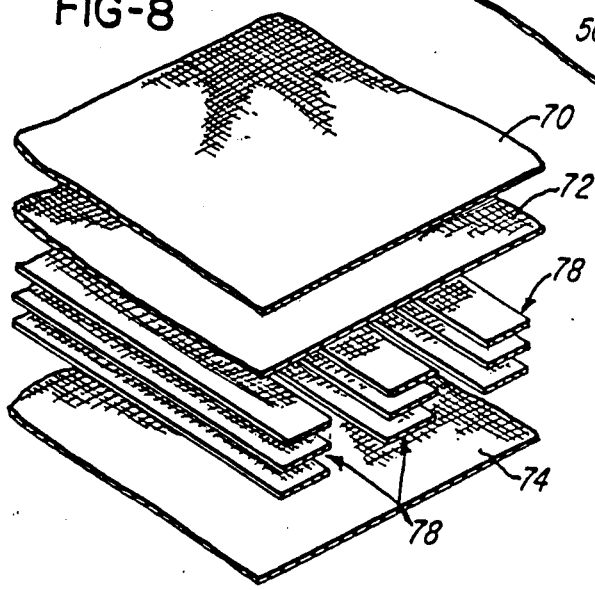
FIG. 8 is an exploded fragmentary perspective view, drawn on substantially the same scale as FIGS. 4 and 6, further illustrating the spacer structure shown in FIG. 7.
Figure 7:
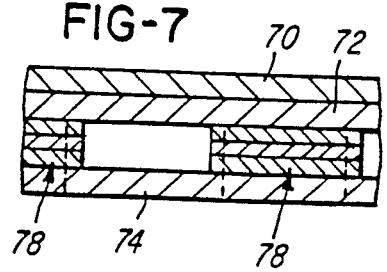
FIG. 7 is a fragmentary sectional view, drawn on substantially the same scale as FIGS. 2 and 5, illustrating another modification in the spacer means positioned between the inner layer and the intermediate layer in a firefighter's garment constructed in accordance with this invention.

FIGS. 7 and 8

FIGS. 7 and 8 show a portion of a firefighter's garment, such as the garment 10 or 12, which is constructed in accordance with this invention. FIG. 7 may be considered as being taken substantially on line 2—2 of FIG. 1. The garment comprises an outer layer 70, an intermediate layer 72, and an inner layer 74. Between the inner layer 74 and the intermediate layer 72 is a plurality of spaced-apart stacks 78 of strips of flexible heat resistant material. The spaces between the stacks 78 provide air space between the inner layer 74 and the intermediate layer 72, and thus excellent thermal insulation is provided while maintaining minimum weight.

SUMMARY

All of the air spacer means and elements shown and disclosed herein are capable of maintaining the same good thermal insulation qualities and characteristics in a firefighter's garment even when localized pressure or loads are applied to portions of the garment and also as localized pressure in the garment occurs as the firefighter moves and works.

A firefighter's garment constructed in accordance with this invention may be a coat or trousers or a garment of this invention may comprise a vest or other article of wearing apparel.

As illustrated in FIGS. 2, 4, 5, and 7, the corrugations 24a, 46a, and the spacer elements 56 and 78 are shown as being substantially vertical within a garment of this invention. Therefore, heated air which exists between the inner layer and the intermediate layer rises between the corrugations or spacer elements. The inner layer which is a thermal barrier is of porous material. Therefore, at the upper portion of the garment, the heated air flows outwardly from the garment through the porous material of the inner layer. Thus, a chimney effect exists within a garment of this invention, and the garment has ventilation qualities.

All or any of the spacer means shown and discussed above may extend through the entire garment, or the spacer means may be positioned only in portions of a firefighter's garment, with conventional layers of insulation material within the other portions of the garment. Thus, portions of such a garment have air space insulation, and portions of such a garment have conventional insulation.

In view of the above discussion and the drawings herein, it is understood that a firefighter's garment constructed in accordance with this invention has the same qualities of protection or better qualities of protection against the environment than conventional garments of a firefighter. However, in addition to these protective qualities, a firefighter's garment of this invention is significantly lighter in weight and less bulky than a conventional garment of a firefighter. Furthermore, a firefighter's garment of this invention has ventilation qualities to aid in constantly cooling the firefighter. Thus, a firefighter's garment of this invention enables a firefighter to work with significantly less stress than occurs in the wearing of a firefighter's conventional garment. Thus, a firefighter wearing a garment which is constructed in accordance with this invention is able to work in a more effective manner and with less danger to the health and well-being of the firefighter.

Although the preferred embodiment of the firefighter's garments of this invention has been described, it will be understood that within the purview of this invention various changes may be made in the form, details, proportion and arrangement of parts, the combination of parts, and the manner of use, which generally stated consist in firefighters'garments within the scope of the appended claims.

The invention having thus been described, the following is claimed:

1. A firefighhter's garment comprising firefighting protective insulative material, the garment including outer shell material which has moisture resistant and abrasion resistant and flame resistant qualities, the garment also including a layer of air spacer material which is covered by the outer shell, the air spacer material including flame resistant material having a degree of rigidity whereby a heat insulation air space is maintained within the firefighhter's garment in all situations in which a firefighter may be involved including situations in which localized external pressure is applied to the garment, the heat insulation air space in the firefighter's garment thus providing continuous and constant excellent insulation for thee firefighter against heat, and whereby the firefighther's garment has minimum weight.

2. The method of construction of a firefighter's garment comprising providing firefighting protective insulation material having flame resistant and abrasion resistant and moisture resistant qualities, in which the firefighting protective material is in the form of at least one layer, providing heat insulation air spacer material having flame resistant qualities and having a degree of rigidly, covering the heat insulation air spacer material by at least one layer of the firefighting protective insulation material, whereby the heat insulation air spacer material establishes and maintains air space within the firefighter's garment even when localized external pressure is applied to the firefighter's garment, the heat insulation air spacer material thus providing air insulation for the firefighter against heat while permitting the firefighter's garment to have minimum weight.

3. A firefighter's garment which is adapted to cover a portion of the body of a firefighter, the firefighter's garment comprising flame resistant material and abrasion resistant material and moisture resistant material, the firefighter's garment also including heat insulation air spacer means, the heat insulation air spacer means being of heat resistant and flame resistant material, the heat insulation air spacer means including material having a degree of rigidity whereby an air space is maintained within the firefighter's garment in all situations in which a firefighter may be involved including situations in which localized external pressure is applied to the firefighter's garment, the air space in the firefighter's garment thus providing continuous and constant excellent thermal insulation protection, whereby the firefighter who wears the firefighhter's garment is protected against a heated environment and whereby the firefighther's garment has minimum weight.

4. The firefighter's garment of claim 3 inn which the air spacer means comprises a plurality of spaced-apart strips of flexible material.

5. The firefighther's garment of claim 3 in which the air spacer means comprises spaced-apart stacks of flexible material.

6. The firefighter's garment of claim 3 in which the air spacer means comprises spaced-apart strips of generally U-shape material.

7. The firefighter's garment of claim 3 in which the garment has an upper portion provided with porous material therein, and in which the heat insulation air spacer means comprises spaced-apart strips of material which extend upwardly within the garment and toward the porous material in the upper portion of the firefighter's garment, whereby body heat generated within the body of the firefighter and within the firefighhter's garment flows upwardly within the firefighter's garment and outwardly from the firefighter's garment through the porous material at the upper portion of the firefighter's garment.

8. The firefighhter's garment of claim 3 in which the garment has an upper portion provided with an opening therein, and in which the heat insulation air spacer means extends upwardly within the garment toward the opening in the upper portion of the firefighter's garment, whereby body heat generated within the body of the firefighter and within the firefighter's garment flows upwardly within the firefighter's garment and outwardly from the firefighhter's garment through the opening at the upper portion off the firefighhter's garment.

9. The firefighter's garment of claim 3 in which the firefighter's garment comprises a coat.

10. The firefighther's garment of claim 3 in which the firefighter's garment comprises trousers.

11. The method of construction of a firefighter's garment which is adapted to cover at least a portion of the body of a firefighter comprising providing firefighting protective insulation material which has flame resistant and abrasion resistant and moisture resistant qualities, the firefighting protective insulation material also including heat insulation air spacer means which comprises flame resistant material and which has a degree of rigidity, forming the firefighting protective insulation material into a firefighhter's garment whereby the heat insulation air spacer means establishes and maintains air space within the firefighter's garment even when localized external pressure is applied to the firefighter's garment, the heat insulation air spacer means thus providing and maintaining thermal insulation in the firefighhter's garment whereby the firefighter who wears the firefighter's garment is protected against a heated environment while the firefighter's garment has minimum weight.

12. The method of claim 11 in which the firefighting protective insulation material which is provided in the form of at least one layer of material and in which the method includes providing heat insulation air spacer means in the form of strips of flame resistant material having a degree of rigidity and in which the method includes attaching the strips of flame resistant material in spaced-apart relationship to at least one off the layers of material.

13. The method of claim 11 in which the firefighter's garment has an upper portion and in which the method includes providing an opening at the upper portion of the firefighther's garment, and in which the method includes orienting the air spacer means inn an upwardly extending direction within the firefighter's garment and toward the opening at the upper portion thereof, whereby body heat generated within the firefighter and within the garment flows upwardly within the air spacer means and within the garment and outwardly from the garment through the opening at the upper portion of the garment.

14. The method of claim 11 in which the firefighter's garment has an upper portion, and in which the method includes providing an opening in the upper portion of the firefighter's garment and in which the method includes providing the heat insulation air spacer means in the form of strips of flame resistant material, and in which the method includes arranging the strips of flame resistant material in an upwardly extending spaced-apart relationship within the garment, whereby body heat generated within the firefighter and within the firefighter's garment flows upwardly within the firefighter's garment and outwardly from the firefighter's garment through thee opening in the upper portion of the firefighter's garment.

* * * * *

UNITED STATES PATENT AND TRADEMARK OFFICE
CERTIFICATE OF CORRECTION

PATENT NO. : 5,001,783
DATED : March 26, 1991
INVENTOR(S) : William L. Grilliot and Mary I. Grilliot It is certified that error appears in the above-identified patent and that said Letters Patent is hereby corrected as shown below:

Column 6, line 2, change "insulative" to ---insulation---, line 14, change "thee" to ---the---; line 24, change "idly" to ---idity---; line 51, change "inn" to ---in---; line 67, change "firefighhter's" to ---firefighter's---.

Column 7, line 13, change "firefighhter's" to ---firefighter's---; line 14, change "off" to ---of---; line 37, change "hter's" to ---ter's---.

Column 8, line 10, change "off" to ---of---; line 15, change "firefighther's" to ---firefighter's---; line 16, change "inn" to ---in---; line 36, change "thee" to ---the---.

Signed and Sealed this

First Day of September, 1992

Attest:

DOUGLAS B. COMER

*Attesting Officer*              *Acting Commissioner of Patents and Trademarks*